(12) United States Patent
Bezawada et al.

(10) Patent No.: US 10,194,009 B2
(45) Date of Patent: Jan. 29, 2019

(54) INTERFACE DEVICE PROVIDING INTRINSIC SAFETY FOR A COMMUNICATIONS DEVICE

(71) Applicant: Honeywell International Inc., Morris Plains, NJ (US)

(72) Inventors: Murali Krishna Bezawada, Hyderabad (IN); John Boettger, Rockledge, FL (US); Bart Meijer, Zuid Holland (NL); Tushar N Nisith Shrimankar, Nagpur (IN)

(73) Assignee: Honeywell International Inc., Morris Plains, NJ (US)

( * ) Notice: Subject to any disclaimer, the term of this patent is extended or adjusted under 35 U.S.C. 154(b) by 177 days.

(21) Appl. No.: 15/064,069

(22) Filed: Mar. 8, 2016

(65) Prior Publication Data
US 2017/0264726 A1 Sep. 14, 2017

(51) Int. Cl.
| | |
|---|---|
| *H04M 1/18* | (2006.01) |
| *H04B 1/3827* | (2015.01) |
| *H04B 1/40* | (2015.01) |
| *H04M 1/02* | (2006.01) |
| *G06K 19/07* | (2006.01) |
| *H02H 9/00* | (2006.01) |
| *H02H 9/04* | (2006.01) |

(52) U.S. Cl.
CPC .......... *H04M 1/18* (2013.01); *G06K 19/0715* (2013.01); *H02H 9/00* (2013.01); *H02H 9/041* (2013.01); *H02H 9/046* (2013.01); *H04B 1/3838* (2013.01); *H04B 1/40* (2013.01); *H04M 1/0274* (2013.01)

(58) Field of Classification Search
CPC ..................................................... G06F 13/387
See application file for complete search history.

(56) References Cited

U.S. PATENT DOCUMENTS

| | | | | |
|---|---|---|---|---|
| 6,952,596 | B2* | 10/2005 | Dearn ....................... | G05F 1/46 455/323 |
| 7,312,716 | B2 | 12/2007 | Kothari et al. | |
| 7,898,786 | B2 | 3/2011 | Schmidt | |
| 2003/0160630 | A1 | 8/2003 | Earle | |
| 2005/0237047 | A1* | 10/2005 | Voisine ................... | G01R 11/04 324/76.11 |
| 2015/0327329 | A1* | 11/2015 | Zhou ..................... | H04J 3/0685 455/436 |

* cited by examiner

*Primary Examiner* — Henry Tsai
*Assistant Examiner* — Juanito Borromeo

(57) ABSTRACT

An interface device for providing Intrinsic Safety to a Smart Identity Module (SIM) card includes a buffer circuit including a voltage regulator and a voltage level translator including drivers. Baseband processor side pins include at least an input/output (IO) pin for receiving data signals, first SIM reset (RST) pin, core power supply (VCC) pin, a clock (CLK) pin, a battery power supply (VBAT) pin, and SIM side pins include at least a VCC pin, a SIM CLK pin, second SIM RST pin, and a SIM IO pin. There is at least one series resistor ($R_1$, $R_2$, $R_3$, $R_4$ and $R_5$) in series with each of the baseband processor side pins.

12 Claims, 3 Drawing Sheets

| TEST CLAUSE | DESCRIPTION | CONTACT | SIGNAL | REQUIREMENT | MEASURED VALUE | RESULT | SIGNAL |
|---|---|---|---|---|---|---|---|
| 5.2.1 | SUPPLY VOLTAGE VCC | C1 | VCC | 2.7-3.3V | 2.97V | PASS | |
| 5.2.2 | RESET | C2 | VOH | 2.4-3.3V | 3.01V | PASS | |
| 5.2.2 | RESET | C2 | VOL | (-) 0.3-0.6V | 0V | PASS | |
| 5.2.2 | RESET | C2 | tr (sim) | 400us | 316ns | PASS | C2_rst_2 |
| | | | tr (INPUT U10) | NA | 22ns | PASS | u10_rst_2 |
| | | | tr (INPUT R50) | NA | 4.6ns | PASS | r50_rst_2 |
| 5.2.3 | CLOCK | C3 | VOH | 2.1-3.3V | 3.02V | PASS | C3_clk_4 |
| | | | VOL | (-) 0.3-0.6V | (-) 0.162V | PASS | C3_clk_4 |
| | | | tr (sim) | 50ns | 3.86ns | PASS | C3_clk_3 |
| | | | tr (INPUT U10) | NA | 10.4ns | PASS | u10_clk_2 |
| | | | tr (INPUT R47) | NA | 4.14ns | PASS | r47_clk_2 |
| | | | DUTY CYCLE | 40-60% | Ttotal=262ns;T0 n=140ns | PASS | |
| 5.2.4 | IO | C7 | VOH | 2.1-3.3V | 2.96V | PASS | C3_clk_4 |
| | | | VOL | (-) 0.3-0.4V | 0V | PASS | C7_io_3 |
| | | | tr (sim) | 100ns | 73ns | PASS | C7_io_3 |
| | | | tr (INPUT U10) | NA | 75.2ns | PASS | u10_io_2 |
| | | | tr (INPUT R48) | NA | 77.6ns | PASS | r48_io_2 |

FIG. 3

INTERFACE DEVICE PROVIDING INTRINSIC SAFETY FOR A COMMUNICATIONS DEVICE

FIELD

Disclosed embodiments relate to interface devices for supporting intrinsically safe communications to wireless communication devices in a hazardous area.

BACKGROUND

In industrial automation, wireless arrangements may be used when it is not desirable or feasible to use cables (e.g., because of distance, installation limitation, etc.). However, there are a limited number of solutions available for use in hazardous areas. Known solutions involve the use of an explosion-proof box where the radio transceiver is mounted and the antenna is "attached" to the explosion-proof box.

The signal strength indicators of these arrangements are not designed for hazardous areas. For example, cellular modems (mobile broadband modems, also known as a connect card or data card) need high power for transmitting data over the cellular network, and during fault scenarios the maximum power in the cellular module can go very high (e.g., 6W). Accordingly, in order to operate in hazardous area the entire transceiver other than the antenna needs to be potted so as to prevent direct exposure of the electronics to the hazardous environment.

A Smart Identity Module (SIM) card is a pocket-sized card with embedded integrated circuits that may be included in the transceiver, such as for access authorization to secure areas in industrial automation. The SIM card is conventionally potted with the other transceiver components. There are some devices with the SIM cards being unpotted, however such devices may not meet telecommunications interface standards such as the European Telecommunications Standards Institute (ETSI) standard requirements because of poor signal quality (e.g., too high a signal rise/fall time to the SIM card).

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize Subscriber Identity Module (SIM)/Universal Integrated Circuit Card (UICC) cards need to be accessible/replaceable for maintenance and troubleshooting purposes and hence cannot be potted. This provides a challenge designing the SIM interface as all interfaces exposed to a hazardous environment needs to limit the power, voltage, current, on each of the interface lines and temperature within the ignition energy limits of hazardous gas. It is recognized that the known SIM interface approach that uses infallible barriers (i.e., safety rated) including series resistors and Zener diodes on all the interface lines cannot offer a solution for cellular modems as it will slow the timing of the SIM communication lines which need fast rise and fall times, such as a rise/fall time <50 ns on the clock line for data as required by the ETSI standard TS 102 221 release 12.

Disclosed embodiments include an interface device for providing intrinsic safety to a SIM card. The interface device includes a buffer circuit including a voltage regulator and a voltage level translator including drivers having a baseband processor side pins including at least an input/output (IO) pin for receiving data signals, a first SIM reset (RST) pin, a core power supply (VCC) pin, a clock (CLK) pin, a battery power supply (VBAT) pin, and SIM side pins including at least a VCC pin, a SIM CLK pin, a second SIM RST pin, and a SIM IO pin, and a ground (GND) pin. There is at least one series resistor ($R_1$, $R_2$, $R_3$, $R_4$ and $R_5$) in series with each of the baseband processor side pins.

BRIEF DESCRIPTION OF THE DRAWINGS

FIG. 3 shows actual/measured lab data test results from a disclosed interface device analogous to the interface device shown in FIG. 2 showing the various signals and requirements, with the measured values shown all meeting the requirements for ETSI TS 102 221 & ETSI TS 102 230.

DETAILED DESCRIPTION

Figure 1:
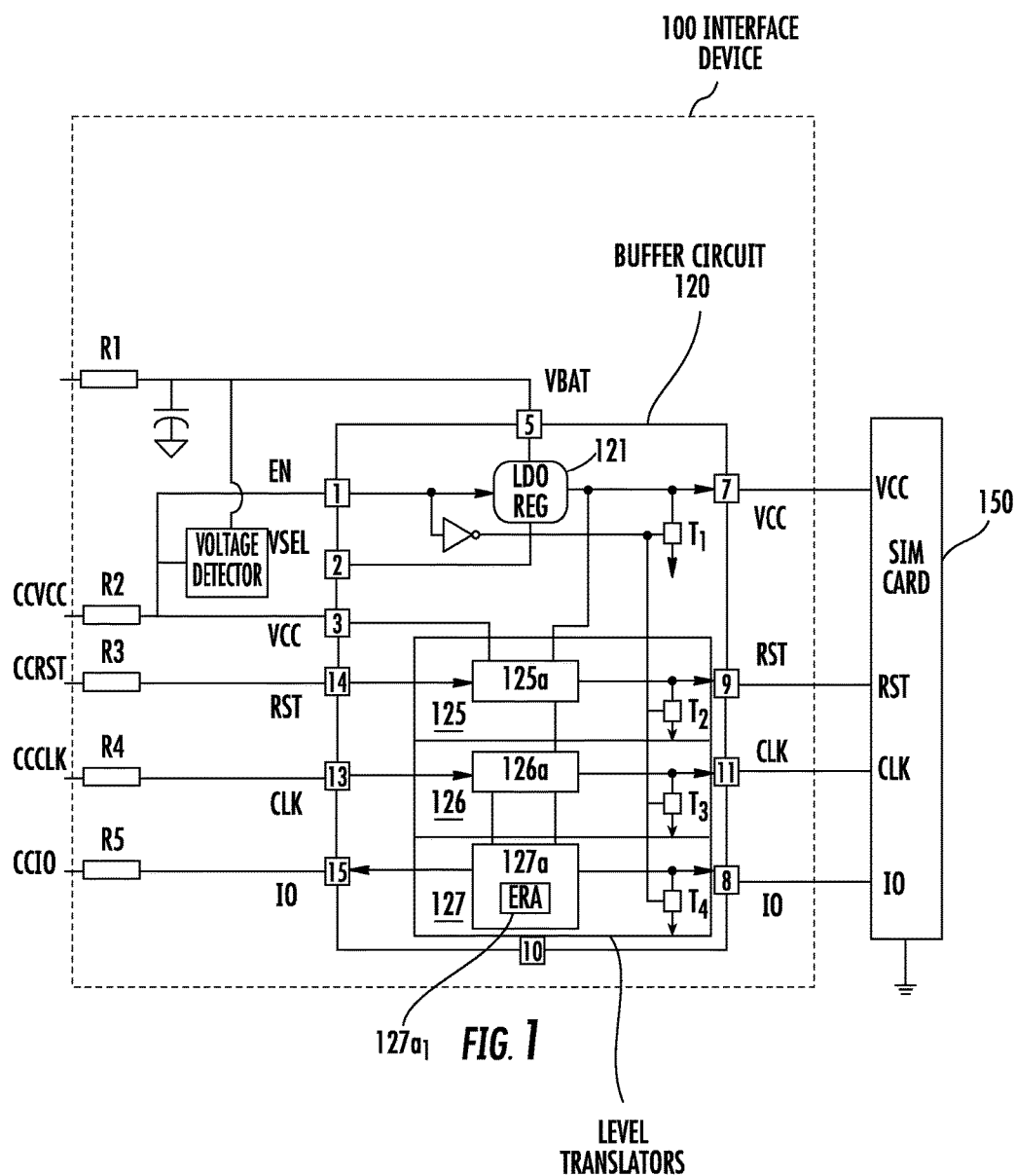
FIG. 1 is a depiction of an example interface device for providing intrinsic safety to a SIM card, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 is a depiction of an example interface device 100 for providing Intrinsic Safety to a SIM card 150, according to an example embodiment. Interface device 100 includes a buffer circuit 120 comprising a voltage regulator 121 (e.g., shown as a Low-DropOut (LDO) regulator) and voltage level translators 125, 126, 127 (collectively level translator 125/126/127). The voltage regulator 121 and voltage level translators 125, 126, 127 can be implemented using multiple different IC's.

The voltage level translators each have drivers 125a, 126a, 127a. Buffer circuit 120 has baseband processor side pins including at least an IO pin for receiving data signals, a first SIM reset (RST) pin, core power supply (VCC) pin, a clock (CLK) pin, a battery power supply (VBAT) pin, and SIM side pins including at least a VCC pin, a SIM CLK pin, second SIM RST pin, and a SIM IO pin, as well as a ground (GND) pin.

Interface device 100 has infallible resistors ($R_1$, $R_2$, $R_3$, $R_4$ and $R_5$) in series with each of the lines of level translators coupled to the baseband processor side pins. Infallible resistors are film type resistors whose failure mode is only an open circuit. Lower resistance resistors can be in series with the CLK pin and IO pin as compared to resistors that are in series with the first RST pin and VCC pin. A resistor (here $R_2$) on the VCC (supply) pin is not a conventional arrangement. Although the RST, CLK and IO signals are all shown connected through voltage level translators 125, 126, 127 to the SIM card 150, at least one of these signals whose rise/fall time is not critical, such as RST, can be directly connected (without a voltage level translator) from the baseband processor to SIM card 150 through infallible resistor(s).

Infallible resistor ($R_1$, $R_2$, $R_3$, $R_4$ and $R_5$) are generally in a range from 50 ohms to 1,000 ohms, except for $R_1$ associated with VBAT which is generally 5 to 25 ohms. The values of the respective resistors are generally selected so that its impact on signal rise/fall time is minimal and also the equivalent resistance of $R_1$ to $R_5$ is high enough to limit the fault power to a level below the ignition level of hazardous gas to SIM card 150 (e.g., limiting power to the SIM card to be 150 mW to about 700 mW). The series resistance on the Vbat line is low so that interface device 100 can supply sufficient power to the SIM card 150 for its proper operation. Infallible resistor ($R_1$, $R_2$, $R_3$, $R_4$ and $R_5$) are generally selected to meet the Intrinsic Safety standard (IEC60079-11 or other) requirement of infallible resistors.

The series resistor ($R_1$, $R_2$, $R_3$, $R_4$ and $R_5$) can all be film type resistors, so that they are able to withstand at least 1.5× of the worst case fault power. A film resistor as used herein is its conventional meaning referring to different film types such as carbon film, metal film, and metal oxide film resistors. Film resistors are generally manufactured by depositing pure metals (e.g., nickel) or oxide film (e.g., tin-oxide) onto an insulating ceramic or substrate, so that the conductive material does not contain binders or insulating material. This design makes film resistors qualified as infallible resistors. The spacing between pads of these series resistors on the board is generally ≥0.5 mm.

The buffer circuit 120 generally comprises an integrated circuit (IC) that includes a bidirectional pass gate with a bidirectional edge rate accelerator (ERA) circuit 127a1 shown as part of driver 127a in FIG. 1 for providing at 25° C. a rise and fall time <50 ns for a data signal received at the IO pin (as required by ETSI standard TS 102 221 release 12). Bidirectional ERA circuits are described, for example, in United States Published Patent Application No. 20030160630 to Earle. The buffer circuit 120 can comprise the FXLP4555 buffer IC from Fairchild Semiconductor International, Inc., or other buffer ICs such as the TXS4555 from Texas Instruments, or the LT4555fb from Linear Technology. The purposes of the buffer circuit 120 includes providing stable and regulated power supply (Vcc_c) to the SIM card 150 (1.8V or 3V), fast rise time and fall time for the signals (Clock, I/O, Reset), following proper power up and power down sequencing (as per the ETSI standard or another standard), and maintaining proper voltage levels (Voh, Vol) for all the signals. Interface device 100 thus uses a combination of series resistors and a buffer circuit 120 to comply with the requirements of Intrinsic Safety, such as for limiting the fault power/energy to within the limits of ignition energy and temperature limits of hazardous gas) and ETSI (or similar) standard requirements for SIM/UICC card interfaces.

Figure 2:
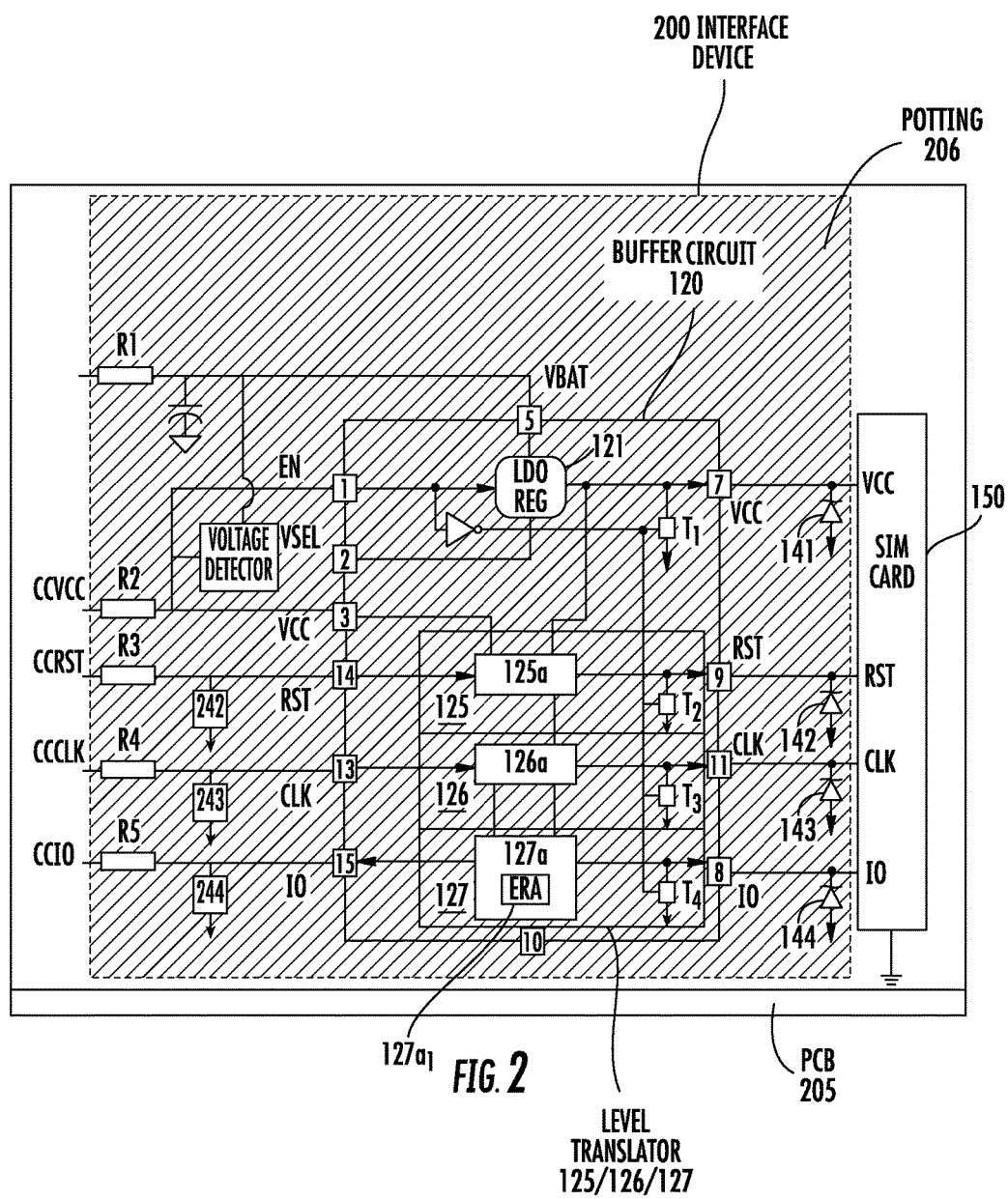
FIG. 2 is a depiction of another example interface device for providing intrinsic safety to a SIM card that includes at least one Zener diode for ESD protection between the SIM side pins and a GND coupled to the GND pin of the SIM card, according to an example embodiment.

FIG. 2 is a depiction of another example interface device 200 for providing intrinsic safety to a SIM card 150 that includes comprising Zener diodes 141, 142, 143, 144 for ESD protection between the SIM side pins and a GND coupled to the GND pin of the SIM card, according to an example embodiment. The interface device 200 along with the SIM card 150 are shown mounted on a printed circuit board (PCB) 205. In the embodiment shown the interface device 200 is mounted on the PCB 205 with a potting material (e.g., epoxy) 206 thereon and the SIM card 150 is mounted on the PCB 205 (generally into a SIM card connector) without the potting material thereon. Although not shown, back-to-back Zener diodes instead of single Zener diodes may be used. Interface device 200 shows the option of adding additional Zener diodes shown as blocks 242, 243, and 244 (e.g., each comprising two properly temperature derated Zener diodes) in parallel to one another to make this zener diode assembly infallible for clamping the over voltages (if any) to a safe value between the level translators 125, 126, 127 and their respective series resistors (R3, R4, R5).

In typical applications for disclosed interface devices, a wireless baseband processor with a SIM card is used to store data for mobile devices. A baseband processor typically includes its own random access memory (RAM) and firmware, and manages all the radio functions (all functions that require an antenna) of the device. SIM cards can be used for authentication of a user in a wireless network, such as access authorization to secure areas as a key substitute. In one example, the buffer circuit 120 can have two supply voltage pins, and VCC can be operated over a full range of 1.5 V to 3.5 V and VBATT from 2.2 to 6 V. VPWR can be set to either 1.8 V or 2.95 V and can be supplied by an internal LDO. The internal LDO can accept input voltages as high as 6 V and output either 1.8 V or 2.95 V at 50 mA to the SIM circuitry and to the external SIM card. The buffer circuit 120 can enable system designers to easily interface low-voltage microprocessors to SIM cards, such as operating at 1.8 V or 2.95 V.

EXAMPLES

Disclosed embodiments are further illustrated by the following specific Examples, which should not be construed as limiting the scope or content of this Disclosure in any way.

FIG. 3 shows actual/measured lab data test results from a disclosed interface device analogous to the interface device 200 shown in FIG. 2 showing the various signals and requirements, with the measured values shown all meeting the requirements per ETSI TS 102 221 & ETSI TS 102 230. The signals tested included several different rise times (tr) as well as voltage levels (VCC, VOH, VOL) for reset, clock and IO.

While various disclosed embodiments have been described above, it should be understood that they have been presented by way of example only, and not limitation. For example, disclosed interfaced circuits can be extended to similar applications such as for interfacing memory cards or other application where signal quality is important for proper operation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. An interface device for providing Intrinsic Safety to a Smart Identity Module (SIM) card, comprising:
   a buffer circuit including a voltage regulator and a voltage level translator including drivers having a baseband processor side pins including at least an input/output (IO) pin for receiving data signals, first SIM reset (RST) pin, core power supply (VCC) pin, a clock (CLK) pin, a battery power supply (VBAT) pin, and SIM side pins including at least a VCC pin, a SIM CLK pin, second SIM RST pin, and a SIM IO pin, and a ground (GND) pin, and
   at least one series resistor ($R_1$, $R_2$, $R_3$, $R_4$ and $R_5$) in series with each of said baseband processor side pins,
   wherein lower resistance ones of said series resistors are in series with said CLK pin and said IO pin as compared to ones of said series resistors that are in series with said first RST pin and said VCC pin.

2. The interface device of claim 1, further comprising at least one SIM side Zener diode between said SIM side pins and a GND coupled to said GND pin.

3. The interface device of claim 1, further comprising a printed circuit board (PCB), wherein said interface device is mounted on said PCB with a potting material thereon and said SIM card is mounted on said PCB without said potting material thereon.

4. The interface device of claim 1, wherein said buffer circuit comprises an integrated circuit (IC) that includes a bidirectional pass gate with a bidirectional edge rate accelerator circuit for providing at 25° C. a rise and fall time <50 ns for a data signal received at said IO pin.

5. The interface device of claim 1, further comprising at least one baseband side Zener diode between said voltage level translators and their respective ones of said series resistors.

6. A circuit combination, comprising:
   a Smart Identity Module (SIM) card;
   an interface device coupled for providing intrinsic safety to said SIM card, said interface device comprising:
      a buffer circuit including a voltage regulator and a voltage level translator including drivers having a baseband processor side pins including at least an input/output (IO) pin for receiving data signals, first SIM reset (RST) pin, core power supply (VCC) pin, a clock (CLK) pin, a battery power supply (VBAT) pin, and SIM side pins including at least a VCC pin, a SIM CLK pin, second SIM RST pin, and a SIM IO pin, and a ground (GND) pin, and
      at least one series resistor ($R_1$, $R_2$, $R_3$, $R_4$ and $R_5$) in series with each of said baseband processor side pins,
      wherein lower resistance ones of said series resistors are in series with said CLK pin and said IO pin as compared to ones of said series resistors that are in series with said first RST pin and said VCC pin.

7. The circuit combination of claim 6, further comprising at least one SIM side Zener diode between said SIM side pins and a GND coupled to said GND pin.

8. The circuit combination of claim 6, further comprising a printed circuit board (PCB), wherein said circuit combination is mounted on said PCB with a potting material thereon and said SIM card is mounted on said PCB without said potting material thereon.

9. The circuit combination of claim 6, wherein said buffer circuit comprises an integrated circuit (IC) that includes a bidirectional pass gate with a bidirectional edge rate accelerator circuit for providing at 25° C. a rise and fall time <50 ns for a data signal received at said IO pin.

10. The circuit combination of claim 6, further comprising at least one baseband side Zener diode between said voltage level translators and their respective ones of said series resistors.

11. The circuit combination of claim 6, wherein said series resistors each comprises film resistors.

12. The circuit combination of claim 6, further comprising at least one baseband side Zener diode between said voltage level translators and their respective ones of said series resistors.

* * * * *